(12) United States Patent
Wiacek

(10) Patent No.: US 9,207,871 B2
(45) Date of Patent: Dec. 8, 2015

(54) INTERNAL NOTEBOOK MICROSD READER WITH READ-ONLY SWITCH

(71) Applicant: Hewlett-Packard Development Company, L.P., Houston, TX (US)

(72) Inventor: Marcin Tomasz Wiacek, Warsaw (PL)

(73) Assignee: Hewlett-Packard Development Company, L.P., Houston, TX (US)

( * ) Notice: Subject to any disclaimer, the term of this patent is extended or adjusted under 35 U.S.C. 154(b) by 245 days.

(21) Appl. No.: 13/764,468

(22) Filed: Feb. 11, 2013

(65) Prior Publication Data

US 2014/0229674 A1    Aug. 14, 2014

(51) Int. Cl.
*G06F 3/06* (2006.01)
*G06F 11/00* (2006.01)

(52) U.S. Cl.
CPC ............ *G06F 3/0634* (2013.01); *G06F 11/004* (2013.01)

(58) Field of Classification Search
None
See application file for complete search history.

(56) References Cited

U.S. PATENT DOCUMENTS

| | | | | |
|---|---|---|---|---|
| 6,484,069 | B2 * | 11/2002 | Osinga | ........................... 700/275 |
| 7,716,633 | B1 * | 5/2010 | Heath | ............................ 717/106 |
| 2002/0144050 | A1 | 10/2002 | Zimmer et al. | |
| 2004/0103341 | A1 | 5/2004 | DeMeo et al. | |
| 2006/0271819 | A1 | 11/2006 | Cluff et al. | |
| 2008/0172518 | A1 | 7/2008 | Shmulevich et al. | |
| 2009/0013134 | A1 * | 1/2009 | Chen et al. | ...................... 711/152 |
| 2010/0082962 | A1 | 4/2010 | Srinivasan et al. | |
| 2011/0087870 | A1 * | 4/2011 | Spangler et al. | ................... 713/2 |
| 2013/0047031 | A1 * | 2/2013 | Tabone et al. | .................... 714/15 |
| 2013/0111551 | A1 * | 5/2013 | Dellacona et al. | ................. 726/3 |

FOREIGN PATENT DOCUMENTS

TW                426859 B        3/2001

OTHER PUBLICATIONS

"Installing and Configuring External Flash Memory Cards in Cisco 3600 Series Routers", < http://www.cisco.com/en/US/docs/routers/access/3600/hardware/notes/PCMCIA.html >, 2002.
"Pocket Dbexplorer 3.1", < http://www.phatware.com/index.php?q=product/details/dbexplorer >, retrieved on Sep. 2, 2011.

* cited by examiner

*Primary Examiner* — Denise Tran
(74) *Attorney, Agent, or Firm* — HGF, Ltd.

(57) ABSTRACT

A computing device can include a connector to connect with a removable storage device. A switch can control the connector to prevent in a first state and allow in a second state at least one of the writing and erasing of a removable storage device connected to the connector. The switch can be prevented from changing states when a component is in a first configuration. The state of the switch can be changeable when the component is in a second configuration. The component is operationally connected to the computing device in the first configuration, and the component is operationally disconnected from the computing device in the second configuration.

4 Claims, 3 Drawing Sheets

INTERNAL NOTEBOOK MICROSD READER WITH READ-ONLY SWITCH

BACKGROUND

Computing devices often have a storage device for storing a BIOS (Basic Input Output System) or EFI (Extensible Firmware Interface). Some computing devices are provided with a storage device for storing a recovery partition that can be used to reset the device to a factory default condition (or some other predetermined condition). Some computing devices are provided with a storage device for storing an operating system.

BRIEF DESCRIPTION OF THE DRAWINGS

Examples of the invention are further described hereinafter with reference to the accompanying drawings, in which.

DETAILED DESCRIPTION

Software or Firmware may become corrupt or may be attacked by malware or viruses. The recovery software may also be attacked by malware or viruses. Malware or viruses may also attack the software locks that prevent changes to the recovery software.

To prevent writing over the software or firmware that is used for recovery a physical switch can be used to write protect the memory containing the software or firmware recovery. If a switch is exposed a user may accidently flip an exposed switch allowing the memory to be written to or erased. A user may have a need to update the data on the memory and therefore the memory cannot be permanently write protected. In one embodiment the state of the switch can be changed if a component is operationally disconnected from the electronic device. When the component is operationally disconnected the state of the switch can be changed to allow writing to the memory and prevent an unintentional state change of the switch because the component would have to be removed first.

Figure 1:
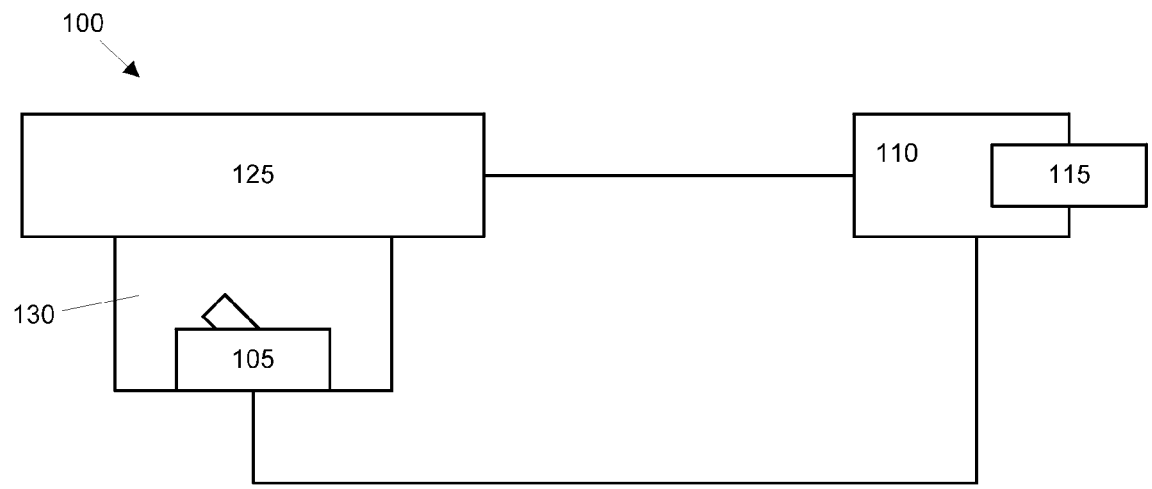
FIG. 1 illustrates a device according to an example.

FIG. 1 shows an arrangement of an electronic device 100 according to examples of the invention. In some examples the electronic device may be a notebook computer.

The device 100 includes a connector 110 to connect the device 100 to a removable storage device 115. In some examples the removable storage device 115 may be a memory card or flash card, such as a microSD card. In some examples the removable storage device 115 may store one or more of the BIOS, EFI, recovery partition, default OS or other software. The connector 110 is arranged to allow communication between the device 100 and the removable storage device 115, e.g by making electrical connection with one or more contacts of the removable storage device 115. The device 100 may be arranged to read or access the removable storage device 115 to use the BIOS, EFI, recovery partition, default OS or other software stored thereon. The device 100 may be arranged to boot using a BIOS or EFI stored on the removable storage device 115, recover to a predefined system condition (e.g. factory settings) using a recovery partition stored on the removable storage device 115, load or restore an operating system of the device 100 using an OS stored on the removable storage device 115, or load other software stored on the removable storage device 115. In some examples device 100 may not operate without removable storage device 115, in some examples device 100 may operate without removable storage device 115. In some examples device 100 may operate in a different or reduced manner without removable storage device 115, compared to the operation with the removable storage device.

The device of FIG. 1 has a switch 105 having at least two states. Switch 105 is arranged to control the connector 110, such that when the switch 105 is in a first state, at least one of writing or erasing of the removable storage device 115 is prevented, and when the switch 105 is in a second state the at least one of writing or erasing of the removable storage device 115 is permitted.

In some examples the removable storage device 115 may have a first voltage input used for reading contents from the removable storage device 115, and a second voltage input, having a higher voltage than the first voltage input, used for at least one of writing content to, or erasing content from, the removable storage device 115. In some examples the switch 105 may disconnect (in the first state) or connect (in the second state) the second input to a voltage source, such that the voltage for writing or erasing the content of the removable storage device 115 is not provided to the removable storage device 115 when the switch 105 is in the first state, thus preventing writing or erasing of the removable storage device 115 when the switch 105 is in the first state. In some examples, the switch 105 may control connection or disconnection of the higher voltage source with the connector 110.

In some examples, switch 105 reduces a risk of unintentional writing or erasing of the removable storage device 115, for example where switch 105 is set in the first state as a factory setting or default setting. In some examples, the switch 105 may reduce the risk of malicious or unauthorized changes being made to the information on the removable storage device 115.

The device 100 includes a component 125 that can be arranged in at least two configurations. In the first configuration, component 125 is operationally connected to the device 100, and in the second configuration the component 125 is operationally disconnected from the device 100. An operational connection may refer to an electrical connection between the device 100 and the component 125. In some examples, the component 125 may be a battery, and the battery is operationally connected to the device 100 when it is electrically connected so as to be able to supply electricity to the device 100 or be charged by the device 100. The device 100 may have a retaining portion to retain the component 125 in place when the component 125 is operationally connected. For example, one or more of an appropriately sized recess, a mechanical clip, a screw, etc. may be provided. The location of the component 125 may be well defined when it is operationally connected to the device 100 (e.g. by being seated in a recess). The component 125 may be operationally disconnected from the computing device but still attached by, for example, a tether.

In some examples, the component 125 may be mechanically connected to the device 100 in the first configuration. In some examples the component 125 may be mechanically disconnected from the device 100 in the second configuration. In some examples reconnecting the component to the device 100 may automatically change the state to of the switch to the first state if the switch is in the second state.

The device 100 and/or component 125 is such that the state of the switch is prevented from changing when the component 125 is in the first configuration, and the state of the switch may can be changed when the component 125 is in the second configuration. For example, the component 125 may prevent access to the switch in the first configuration. FIG. 1 shows the device 100 with the component 125 in the first configuration. In the example of FIG. 1, the switch 105 is located in a recess 130, and in the first configuration the component 125 covers the recess 130 and prevents access to the switch 105. In the Example of FIG. 1, component 125 is a battery, and provides power to the device 100.

In some examples the removable storage device 115 may be physically accessible to a user (e.g, by unclipping or unscrewing a portion of a housing of the device 100). The removable storage device 115 may be more easily accessed by a user than the internal workings of the device 100 (e.g, circuit boards, etc.)

In some examples, the connector 110 is provided on a mainboard or motherboard of the device 110, and may be accessible only after the device has been disassembled (e.g. to expose the mainboard or motherboard.)

In some examples, the removable storage device 115 may enable information, such as information to restore the system, factory reset information, operating system information, etc. to be kept with (e.g. internal to) the device 100, without storing this information on a main storage device of the device 100. This avoids or reduces the need to store and/or keep on hand storage media such as compact discs (CDs) or DVDs. Furthermore, where CDs or DVDs are used, they are easily damaged and require the device to have an optical drive.

In some examples, connector 110 may be programmatically disabled by device 100 to save power. In some examples, connector 110 may be inaccessible to software installed on the device 100 after a booting sequence of device 100 has completed, or in other situations. In some examples, connector 110 may be enabled or disabled based on a user input or a user-controllable setting, such as an option in BIOS or EFI, for example.

In some examples the device 100 may have a storage device, such as a hard disk (herein reference will be made to a hard disk, but other storage devices could be used). Where the removable storage device 115 is provided, it is may be unnecessary to store the same information on the hard disk. Accordingly, all the hard disk may be available to the user, or more of the hard disk relative to a device not having removable storage device 115. For example, where an EFI module, operating system or recovery partition is stored on the removable storage device 115, it may be unnecessary to store the same information on the hard disk, such that the amount of disk space available to the user is increased relative to the situation where the operating system or recovery partition is stored on the hard disk.

In some cases use of the removable storage device 115 may reduce or eliminate a need to partition a hard disk. As the number of partitions may be limited by some operating systems, this may provide greater flexibility for the user. For example, where the removable storage device stores a recovery partition it may not be necessary to provide a recovery partition on the hard disk, and so the number of partitions on the hard disk can be reduced.

In some examples, providing the BIOS or EFI on the removable storage device 115 may simplify repair or upgrade of the device. Should the BIOS or EFI become damaged or obsolete, the removable storage device 115 may be removed and either replaced with a new removable storage device with corresponding information already stored thereon, or the removable storage device 115 may be re-written (e.g. by the device 100, or by using a different computing device). In some cases, this operation of replacing the removable storage device 115 may be performed by a non-expert user.

In some cases the use of a removable storage device 115 may provide improved protection for the information stored thereon, compared with information stored on a hard disk. For example, a user may unintentionally delete or alter information on a hard disk of the device 100, for example by formatting the disk. Where unintentional changes are made to the hard disk, the information on the removable storage device 115 would not be affected. Similarly if the hard disk were to fail, the information on the removable storage device 115 would not be affected. In some examples, the use of the removable storage device 115 may prevent malicious/unauthorized changes to the information stored thereon, or may make malicious/unauthorized changes more difficult or less likely than when the information is stored on a hard disk.

Figure 2:
FIG. 2 illustrates an example of the device of FIG. 1 with a component in a second configuration.

FIG. 2 shows the device 100 of FIG. 1 with the component 125 in the second state (in this example, completely removed from the device 100). In this state the switch 105 is exposed or accessible to a user and the state of the switch may be changed (e.g. by pushing or flipping the switch).

Figure 3:
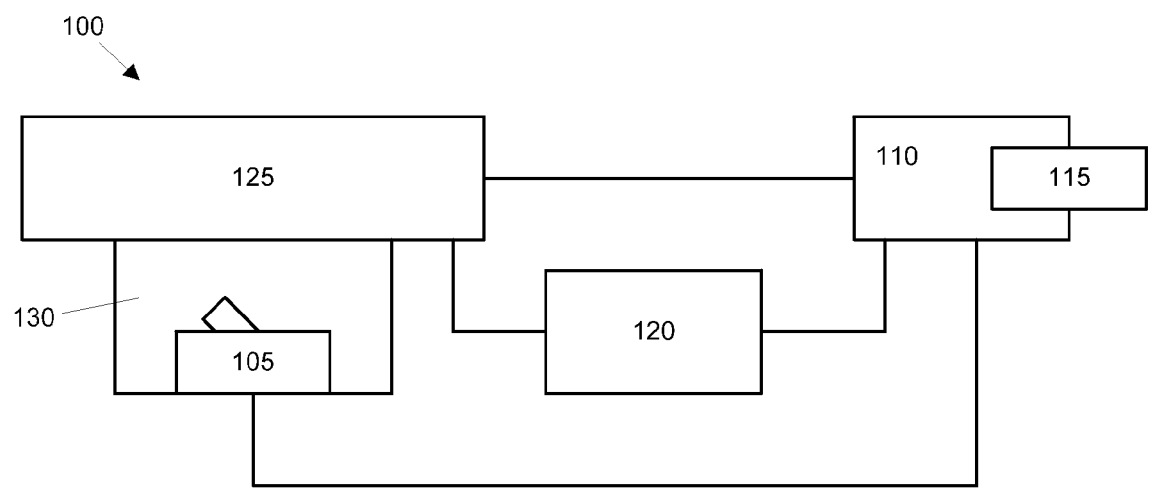
FIG. 3 illustrates a device according to an example.

FIG. 3 shows an example having a processing section 120. The processing section may include one or more of a processor, storage section, circuit boards, etc. Where the component 125 is a battery, it may supply power to the processing section 120. The processing section may provide control information to components of the device 100. For example, the processing section 120 may provide control information to the connector 110.

In some examples the processing section 120 may receive information from the removable storage device 115, read via the connector 110. In some examples the processing section 120 may provide control information to cause the connector 110 to perform at least one of read information from the removable storage device 115, write information to the removable storage device 115, or erase information from the removable storage device 115. The device 100 may be arranged such that write and/or erase instructions are not sent to the connector 110 when the switch 105 is in the first state. The device 100 may be arranged such that any write and/or erase instructions sent to the connector 110 are ignored or are unsuccessful when the switch is in the first state.

Figure 4:
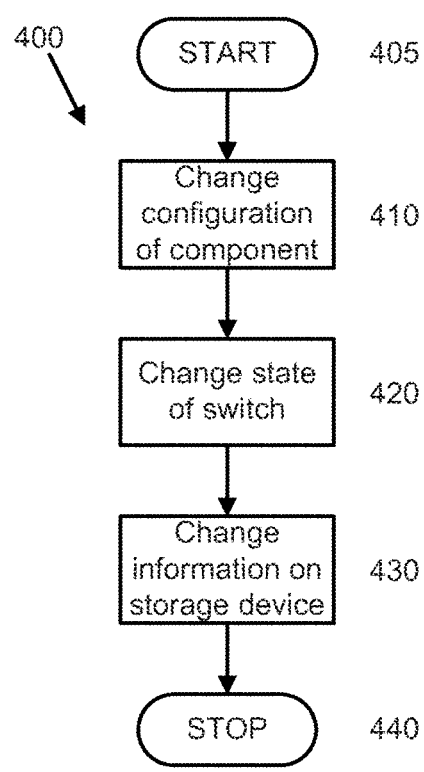
FIG. 4 illustrates a method according to an example.

FIG. 4 illustrates a method 400 according to an example. The method 400 begins at 405. At 410 the configuration of the component 125 is changed or set to the second configuration. At 420 the state of the switch 105 is changed or set to the second state. The state of the switch 105 is changeable because the component 125 is in the second configuration. At 430 the information on the removable storage device 115 is changed, for example by at least one of writing or erasing the removable storage device 115. The method terminates at 440. In some example, following termination of the method, the state of the switch and/or the configuration of the component 125 may be changed back to their starting values. Where both are to be changed, the state of the switch may be changed before the configuration of the component, if the component is to be changed to the first configuration.

Figure 5:
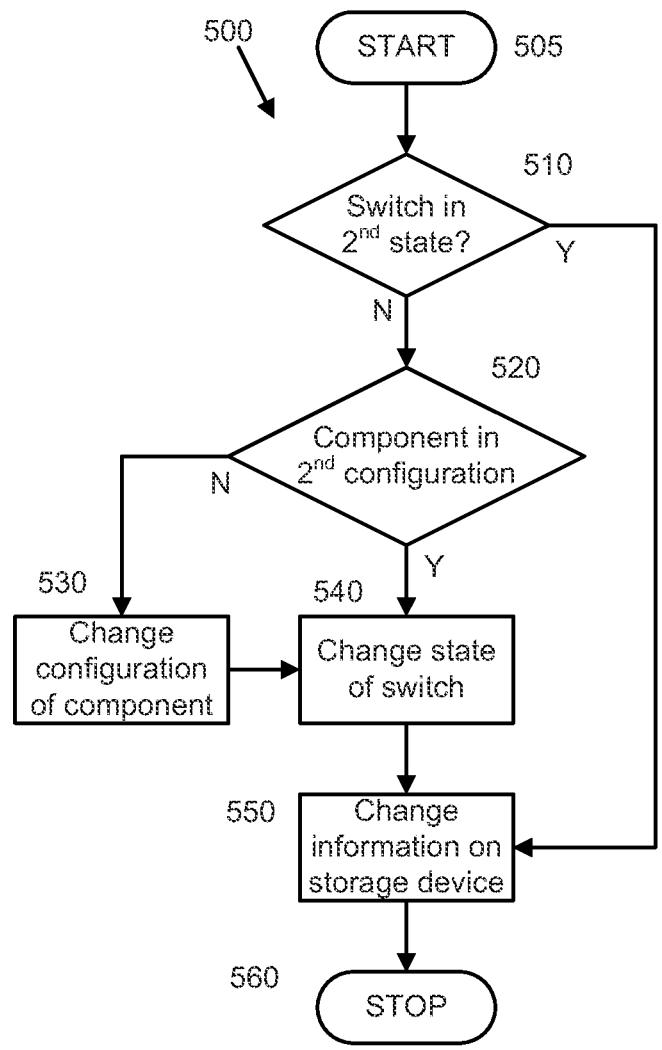
FIG. 5 illustrates a method according to an example.

FIG. 5 illustrates a method 500 according to another example. The method begins at 505. At 510 it is determined whether the switch 105 is in the second state. If the switch 105 is in the second state the method proceeds to 550. Otherwise, the information on the storage device cannot be changed and the method moves to 520, where it is determined whether the component 125 is in the second configuration. If the component 125 is in the second configuration, the method moves to 540. Otherwise, it is not possible to change the state of the switch 105, and the method moves to 530. At 530, the configuration of the component 125 is changed to the second configuration, and the state of the switch 105 may be changed. The method then moves to 540 and the state of the switch 105 is changed to the second state, and the information on the removable storage device 115 may be changed. The method then moves to 550, and the information on the removable storage device 115 is changed, for example by at least one of writing or erasing the removable storage device 115. Subsequently, the configuration of the component 125 may be changed back to the starting configuration. The state of the switch 105 may be changed back to its starting state. Following completion of the method at 560, the state of the switch may be changed before the configuration of the component, if the component is to be changed to the first configuration.

One example provides a circuit board having a switch 105 for controlling a connector 110. The connector 110 being controlled based on a state of the switch 105, such that a removable storage device 115 connected to the connector 110 can be at least one of written to or erased when the switch 105 is in a second state, but not when the switch 105 is in a first state. The switch 105 may be prevented from changing states when a component 125 is in a first configuration, but may change states when the component is in a second configuration. The component 125 is operationally connected to the device 100 in the first configuration and operationally disconnected from the device 100 in the second configuration.

Device 100 may be a computing device. In some examples the device 100 may be a desktop computer, a laptop computer, a netbook computer, a tablet computer, or a mobile phone.

In some examples the removable storage device may be flash memory, a memory card, an SD card, or a micro SD card, a CompactFlash card, a Memory Stick, etc.

Switch 105 may be a mechanical switch or hardware switch, and may be suitable for manual operation.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect or example of the invention are to be understood to be applicable to any other aspect or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A computing device comprising:
   a removable storage device;
   a removable battery;
   a connector to connect with the removable storage device;
   a switch having a first state and a second state, the switch to prevent at least one of writing to or erasing of information stored on the removable storage device in the first state, and permit the at least one of writing to or erasing of the information stored on the removable storage device in the second state; and
   a retaining element to mechanically retain the removable battery to the computing device and cause the switch to remain in the first state;
   wherein the retaining element is to automatically change the switch from the second state to the first state upon connection of the battery to the computing device.

2. The computing device of claim 1, wherein the removable storage device is one of a memory card, an SD card, and a micro SD card.

3. The computing device of claim 1, wherein the information stored on the removable storage device executes at least one of a BIOS, an EFI, a recovery partition, and default OS files.

4. The computing device of claim 1, wherein the computing device is one of a desktop computer, a laptop computer, a notebook computer, a netbook computer, a tablet computer, and a mobile phone.

\* \* \* \* \*